United States Patent [19]

Okamoto

[11] 4,396,207

[45] Aug. 2, 1983

[54] TILT TYPE STEERING DEVICE

[75] Inventor: Fumisada Okamoto, Maebashi, Japan

[73] Assignee: Nippon Seiko Kabushiki Kaisha, Tokyo, Japan

[21] Appl. No.: 305,517

[22] Filed: Sep. 25, 1981

[30] Foreign Application Priority Data

Sep. 29, 1980 [JP] Japan ............................ 55-134470

[51] Int. Cl.³ .............................................. B62D 1/18
[52] U.S. Cl. .................................... 280/775; 74/493; 74/527; 180/78
[58] Field of Search ......................... 280/775; 180/78; 74/493, 527

[56] References Cited

U.S. PATENT DOCUMENTS 3,628,396 12/1971 Grobowski ........................ 280/775

Primary Examiner—Joseph F. Peters, Jr.
Assistant Examiner—John A. Carroll
Attorney, Agent, or Firm—Wyatt, Gerber, Shoup, Scobey & Badie

[57] ABSTRACT

A tilt steering device has an upper bracket and a lower bracket. The upper bracket has downwardly extending side plates on the opposite sides thereof and overlapping portions of upwardly extending side plates on the lower bracket. An angle limiting device couples the upper bracket tiltably with the lower bracket, and a first spring urges the upper bracket toward an upper-most position. A rod is supported for rotation and axial movement by the side plates of one of the brackets. A connecting arm is fixed to the rod and extends adjacent to one of the side plates of the other bracket. An operating lever is connected to the rod so as to be capable of imparting to the rod rotation and axial movement resisting biasing force of a second spring which urges the connecting arm axially of the rod toward the one side plates. A selecting device is provided on said one bracket. The selecting device is provided with a plurality of portions arranged at radial positions entered at the center of rotation of the rod with predetermined selected angles therebetween to engage an engaging portion of one of the rod and the operating lever. The connecting arm has a coupling protrusion at the other end thereof. The side plate of the other bracket which is adjacent to the connecting arm is provided with a plurality of coupling holes capable of mating with the coupling protrusion of the connecting arm.

2 Claims, 7 Drawing Figures

TILT TYPE STEERING DEVICE

BACKGROUND OF THE INVENTION

1. Field of the Invention

This invention relates to a tilt type steering device in which the mounting angle of the steering wheel is adjustable.

2. Description of the Prior Art

Aside from devices for adjusting the position of the steering wheel axially of the steering shaft to obtain the position of the steering wheel suitable for the physique of the driver, devices for adjusting the mounting angle of the steering wheel with respect to the steering shaft have long been known.

There are two types of such devices, namely, the type in which the mounting angle of the steering shaft with respect to the vehicle body is adjustable with a universal joint connecting the lower portion of the steering shaft to the steering gear serving as the center of rotation, and the type in which the upper portion of the steering shaft is divided into two (upper and lower) parts and only the upper steering shaft is tiltable with the joint connecting the upper and lower parts together serving as the center of tilting motion. In the latter type, the mounting angle of the steering shaft with respect to the vehicle body normally does not change. The present invention is concerned with the latter type.

SUMMARY OF THE INVENTION

It is an object of the present invention to provide a tilt type steering device of simple construction which permits the driver to readily get on and off the driver's seat and which enables the steering wheel to be selectively positioned in the driver's favorite driving position by only one adjusting operation, and eliminates the necessity of re-selecting the position of the steering wheel each time the driver gets in the vehicle.

The invention will become fully apparent from the following detailed description thereof taken in conjunction with the accompanying drawings.

DESCRIPTION OF THE PREFERRED EMBODIMENTS

Figure 1:
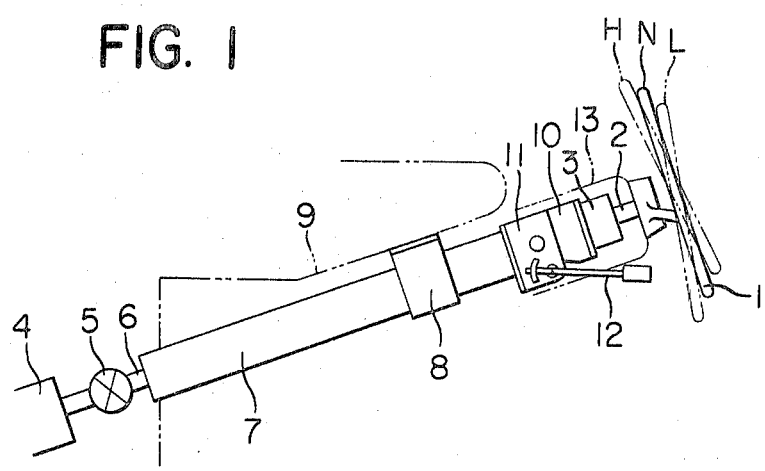
FIG. 1 is a side view showing the manner in which a first embodiment of the present invention is mounted to the vehicle body.
Figure 2:
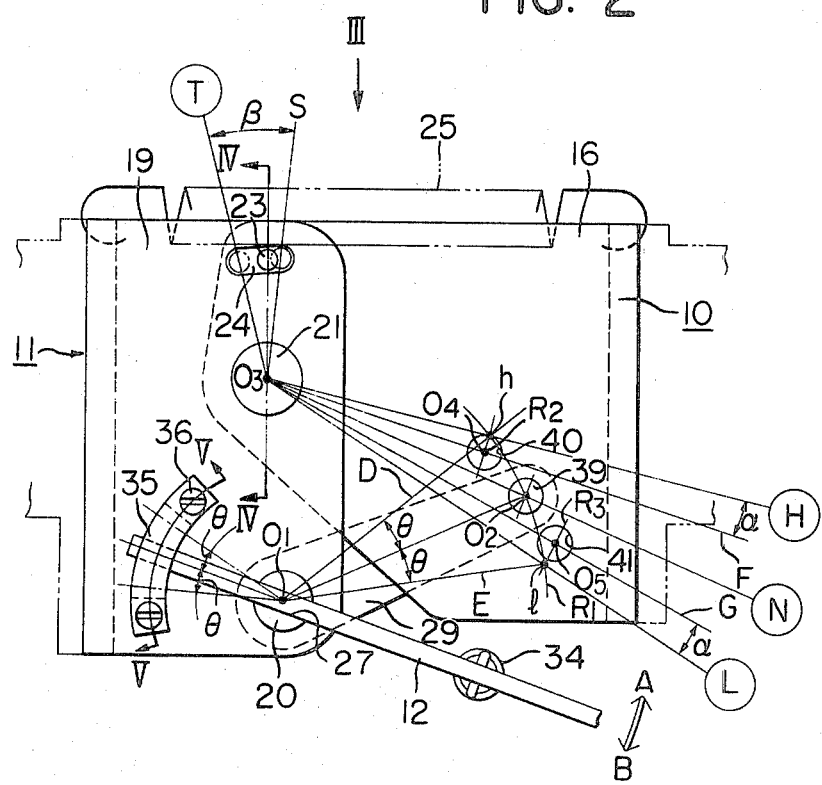
FIG. 2 is a side view showing essential portions of a tilt mechanism of the first embodiment.

The construction of the present invention will hereinafter be described with respect to a first embodiment. Referring to FIG. 1, an upper shaft 2 having a steering wheel 1 mounted thereon is rotatably supported by an upper column 3, and a lower shaft 6 connected to a steering gear 4 through a universal joint 5 is rotatably supported by a lower column 7. The lower column 7 is mounted to a vehicle body portion 9 by means of a column bracket 8 fixed to the lower column 7, and the upper shaft 2 and the lower shaft 6 are tiltably connected together by a universal joint 20 indicated by dots-and-dash line in FIG. 3. The base portion of an upper bracket 10 is secured to the lower portion of the upper column 3 by means such as a bolt or the like, and the base portion of a lower bracket 11 is likewise secured to the upper portion of the lower column 7, the two brackets 10, 11 being connected together in a manner which will hereinafter be described.

Reference numeral 12 designates an operating lever, and a cowl 13 indicated by dots-and-dash line covers the upper portion of a steering device, the operating lever 12 jutting out from the side of the cowl 13. In FIGS. 2 to 5 which show the state wherein the steering wheel 1 in its neutral position N indicated by solid line in FIG. 1, a right side plate 15 and a left side plate 16 both extending downwardly are provided on the opposite sides of a base portion 14 of the upper bracket 10, and a right side plate 18 and a left side plate 19 both extending upwardly are provided on the opposite sides of a base portion 17 of the lower bracket 11. The side plates of the lower bracket 11 partly overlie on the outer sides of the side plates of the upper bracket 10, these side plates of the two brackets being tiltably connected by two coupling members 21 on the center line of the universal joint 20 indicated by dots-and-dash line in FIG. 3. The universal joint 20 is connected to the upper and lower shafts extending through holes (not shown) formed in the base portions 14, 17 of the two brackets 10, 11.

Figure 4:
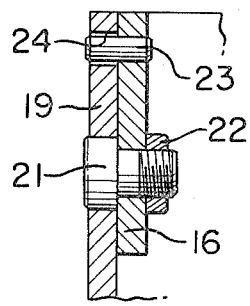
FIG. 4 is a cross-sectional view taken along line IV—IV of FIG. 2.
Figure 5:
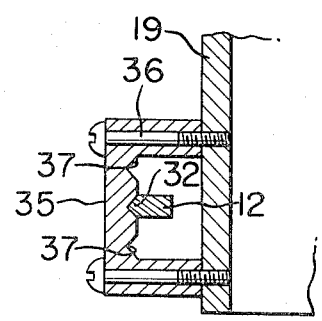
FIG. 5 is a cross-sectional view taken along line V—V of FIG. 2.

As is shown in FIG. 4, the cylindrically-shaped heads of the coupling members 21 are fitted in cylindrically-shaped holes formed in the outwardly positioned side plates 18, 19 of the lower bracket 11 and the shanks thereof are also fitted in the holes of the inwardly positioned side plates 15 and 16 of the upper bracket 10, and are fixed thereto by means of nuts 22. A stopper pin 23 is held to the left side plate 16 of the upper bracket above the coupling member 21, and this stopper pin 23 is loosely fitted in an arcuate slot 24 formed in the left side plate 19 of the lower bracket to form an angle limiting device for controlling the range of tilting of the upper and lower brackets 10, 11 about the coupling members 21. The upper bracket 10 is always urged upwards by a tension spring 25 shown only in FIG. 2 and, unless restrained by other functions, the upper bracket 10 is upwardly moved and stopped when the stopper pin 23 comes into contact with the left end of the slot 24. The line passing through the center of the stopper pin 23 and through the center of rotation $O_3$ of the coupling member 21 when the stopper pin 23 is in contact with the left end of the slot 24 is indicated by a line Ⓣ and this position is called a leap-up position. Assuming that the line passing through the center of the stopper pin 23 and through the center of rotation $O_3$ of the coupling member 21 when the stopper pin 23 has come into contact with the right end of the slot 24 is a line S, the angle formed between the line Ⓣ and the line S is the maximum angle of inclination $\beta$ of the upper and lower brackets 10, 11.

The portions of the side plates 15, 16 of the upper bracket 10 which are below the coupling member 21 are slantly cut away and these portions are not overlapped with the side plates 18, 19 of the lower bracket 11. At these portions which are not overlapped, the side plates 18, 19 of the lower bracket 11 support a rod 26 for rotation and axial movement thereof. The rod 26 comprises a short end portion of relatively large diameter and a long shank portion of small diameter, the end portion being supported by the left side plate 19 and the shank portion being supported by the right side plate 18. About one half of the end portion juts outwardly of the left side plate 19 and a split 27 is provided there, the operating lever 12 being fitted in the split 27 and pivotally mounted therein by means of a pin 28. The end portion of the rod 26 is connected to the shank portion within the left side plate 19 and a stepped portion is provided at the boundary therebetween. The boss portion of a connecting arm 29 is fitted over the shank portion of the rod 26 and axially positioned by the stepped portion, the connecting arm 29 being fixed against rotation relative to the rod 26 by means such as a set screw, a key or winding. The position of the stepped portion is determined such that the connecting arm 29 occupies a position adjacent to the inside surface of the left side plate 16 of the upper bracket 10. A compression spring 30 having one end engaged with the connecting arm 29 and the other end engaged with the inside surface of the right side plate 18 is fitted over the shank portion, and this spring provides a biasing means for normally urging the connecting arm 29 axially of the rod 26 toward the left side plate 16.

The operating lever 12 is provided with an arcuate bulged portion 31 which contacts the bottom of the split 27, and a protrusion 32 of triangular cross-section is provided on the outside of the fore end of the operating lever 12 beyond the bulged portion 31. The rear end of the operating lever which is adjacent to the steering wheel provides a knob 33, and a tension spring 34 is attached to the intermediate portion of the operating lever 12 between the pivoted portion thereof and the knob 33, the other end of the tension spring 34 being restrained on the right side plate 15 of the upper bracket 10 so as to urge the operating lever 12 counterclockwise in FIG. 3 about the pin 28.

A block 35 of a selector device is secured by small screws 36 to such a position of the left side plate 19 as opposing the fore end of the operating lever 12. The block 35 is a member which, as seen in a plan view, is curved into an arcuate form centered at the center of rotation $O_1$ of the rod 26 and, in the illustrated embodiment, it is provided with three recesses 37 in the underside thereof and restrains the fore end protrusion 32 of the operating lever 12. The recesses 37 are triangular grooves corresponding to the cross section of the protrusion 32 and the number thereof is not limited to three. When the steering wheel 1 is in its neutral position indicated by N in FIG. 1, the protrusion 32 of the operating lever 12 is restrained by the central recess 37, and the upper and lower recesses 37 are provided in a radial form centered at the aforementioned center of rotation $O_1$ at arbitrarily selected angles $\theta$ relative to the central recess 37. These selected angles $\theta$ are angles which can be arbitrarily selected independently of the aforementioned maximum angle of inclination $\beta$ and need not be the same angle with each other. That is, the selected angle $\theta$ above the central recess or neutral position and the selected angle $\theta$ below the neutral position may be different from each other. On the other hand, the connecting arm 29 is provided on the outside of its fore end with a coupling projection 38 having a tapered outer peripheral surface, and this coupling projection 38 is fitted in a first coupling hole 39 of three tapered holes provided in the left side plate 16 of the upper bracket 10, at the neutral position shown in FIG. 2.

Let $O_2$ be the center of the first coupling hole 39, depict an arc having as the radius the distance between the center $O_2$ of the first coupling hole 39 and the center of rotation $O_1$ of the rod 26 with the center of rotation $O_1$ of the rod 26 being as the center, and let $R_1$ be this arc. Draw two straight lines D and E passing through the center of rotation $O_1$ of the rod 26 on both sides of the straight line $O_1$-$O_2$ at the aforementioned selected angles $\theta$ with respect to the straight line $O_1$-$O_2$, and let h and l be the points of intersection between the straight lines D, E and the arc $R_1$. Where the selected angles $\theta$ differ from each other on the opposite sides of the neutral position, the upper straight line D is drawn at the selected angle with respect to the line $O_1$-$O_2$ by which the operating lever 12 is to be rotated in the direction of arrow A in FIG. 2, and the lower straight E is drawn at the another selected angle with respect to the line $O_1$-$O_2$ by which the operating lever 12 is to be rotated in the direction of arrow B. Also, where two recesses 37 are provided on the arrow A rotation side of the recess 37 corresponding to the neutral position, straight line D is drawn as previously described, and a straight line forming an angle equal to the sum of the two selected angles on the arrow A side with respect to the straight line $O_1$-$O_2$ is drawn above the straight line D.

Next, depict two arcs having as the radii the distance between the center of rotation $O_3$ and aforementioned points of intersection h and l with the center of rotation $O_3$ of the coupling member 21 being as the center, and let $R_2$ and $R_3$ be these arcs. Also, draw straight lines passing through the center of rotation $O_3$ of the coupling member 21 and through the aforementioned points of intersection h and l and the center $O_2$ of the first coupling hole 39, and let Ⓗ , Ⓛ and Ⓝ be these lines. The straight lines Ⓗ and Ⓛ lie on the opposite sides of the straight line Ⓝ . Draw straight lines forming a suitable tilt angle $\alpha$ with respect to the straight lines Ⓗ and Ⓛ , and let F and G be these lines. Let $O_4$ be the point of intersection between the straight line F and the arc $R_2$ of smaller radius of the arc centered at the center of rotation $O_3$ of the coupling member 21, and let $O_5$ be the point of intersection between the straight line G and the arc $R_3$ of larger radius. Then, the points of intersection $O_4$ and $O_5$ are the centers of the other coupling holes 40 and 41. The other coupling holes 40 and 41 may be provided at such positions. Also, where two recesses 37 lie on the arrow A rotation side as previously described and a straight line is drawn above the upper straight line D passing through the center of rotation $O_1$ of the rod 26, a third arc $R_4$ (not shown) passing through the point of intersection $h_0$ (not shown) between that straight line and the arc $R_1$ and centered at the center of rotation $O_3$ of the coupling member 21 may be drawn, and a straight line $H_0$ (not shown) forming an angle $(2\alpha)$ twice the tilt angle $\alpha$ with respect to the straight line $O_3$-$h_0$ on the straight line Ⓝ side may be drawn, and the point of intersection between this straight line $H_0$ and the third arc $R_4$ may be the center of a fourth coupling hole. There are several tilt angles $\alpha$ within the maximum angle of inclination $\beta$, and these tilt angles are suitably determined with the maximum angle of inclination $\beta$ and the number of tilt positions taken into account such that the leap-up position can be provided further above the upper tilt position.

Figure 3:
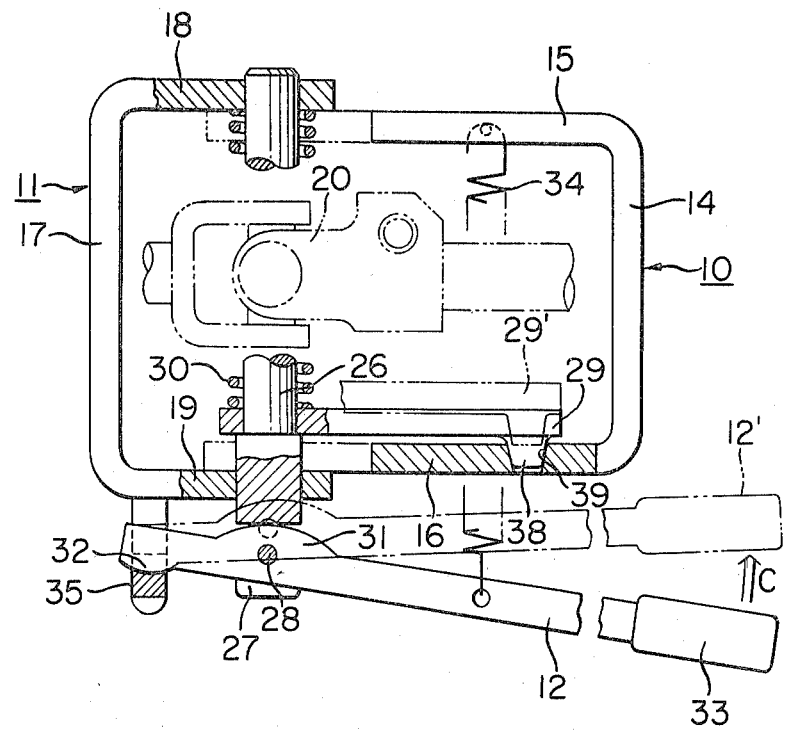
FIG. 3 is a plan view, partly in cross-section, of the tilt mechanism as seen in the direction of arrow III in FIG. 2.

Assuming that the operating lever 12 has been moved by the selected angle $\theta$ in the direction of arrow A while being pushed in the direction C indicated in FIG. 3, the rod 26 is rotated and the connecting arm 29 fixed to the rod 26 is also rotated by the angle $\theta$ and the center of the coupling protrusion 38 is moved to the point of intersection h between the arc $R_1$ and the straight line D. When the upper bracket 10 is tilted in the direction of arrow A with the coupling member 21 as the axis, the center $O_4$ of the upper coupling hole 40 is moved by the tilt angle $\alpha$ on the arc $R_2$ and becomes coincident with the aforementioned point of intersection h. That is, the center of the coupling protrusion 38 becomes coincident with the center of the upper coupling hole 40 and the coupling protrusion is fitted in the upper coupling hole. This position is the position H of the steering wheel 1 indicated by dots-and-dash line in FIG. 1. Conversely, when the operating lever 12 is moved in the direction of arrow B, the coupling protrusion 38 is fitted in the lower coupling hole 41 and the steering wheel 1 assumes a position L indicated in FIG. 1. In this manner, the other coupling hole than the first coupling hole 39 restrains the coupling protrusion 38 of the connecting arm when the fore end protrusion 32 of the operating lever is in the recess 37 outside the neutral position in the selecting device and the connecting arm 29 is rotated with the operating lever 12 and when the upper and lower columns 3, 7 assume selected angles of inclination.

Operation will now be described. In FIG. 3, when the operating lever 12 is moved in the direction of arrow C, namely, rightwardly to the driver, the operating lever 12 assumes a position indicated by dots-and-dash line 12' with the fore end protrusion 32 thereof as the fulcrum. The bulged portion 31 of the pivoted portion of the operating lever 12 pushes the bottom of the split 27 of the rod 26 and moves the rod 26 axially against the force of the compression spring 30. The bulged portion 31 need not always be provided, and the movement of the operating lever 12 may be transmitted to the rod 26 through the pin 28, and in this case, the diameter of the pin 28 must be large enough to bear the aforementioned spring force. With the axial movement of the rod 26, the connecting arm 29 fixed to the rod 26 is also moved, so that the coupling protrusion 38 comes out of the first coupling hole 39 provided in the left side plate 16 of the upper bracket 10. The position of the connecting arm 29 at this time is indicated by dots-and-dash line 29'. Thus, the checking function in the direction of rotation of the upper and lower brackets 10, 11 is lost, so that the upper bracket 10 is rotated in the direction of arrow A of FIG. 2 to the leap-up position by the spring force of the tension spring 26 having its opposite ends secured to the upper and lower brackets 10, 11 until the stopper pin 23 of the angle limiting device comes into contact with the left end of the slot 24. At this time, the steering wheel 1 tilts upwards more greatly than the position H indicated by dots-and-dash line in FIG. 1.

If the driver gets on and off the driver's seat at this leap-up position, the lower end of the steering wheel 1 is greatly spaced apart from the seat and the getting on and off the driver's seat is very easy without being hampered by the steering wheel. When the driver takes the driver's seat and tilts the steering wheel 1 to his side, the upper bracket 10 tilts together with the steering wheel and the first coupling hole 39 provided in the left side plate 16 returns to a position in which it can be engaged with the coupling protrusion 38 of the connecting arm 29, and the rod 26 returns axially with the aid of the spring force of the compression spring 30. Thus, the coupling protrusion 38 fits in the coupling hole 39. In the meantime, the coupling protrusion 38 is urged against the inner side surface of the left side plate 16, but since only the first coupling hole 39 is provided on the arc centered at the center of rotation $O_3$ of the coupling member 21, the upper and lower brackets 10, 11, in other words, the upper and lower columns are never coupled together at any other position during the time they reciprocate between the leap-up position and the neutral position. Next, when the operating lever 12 is further moved in the direction of arrow A while remaining moved in the direction of arrow C as previously described, the fore end protrusion 32 of the operating lever shifts from the central recess 37 of the selecting device to the lower recess 37. Along therewith, the rod 26 and the connecting arm 29 are moved in the direction of arrow A by the selected angle $\theta$ and the center of the coupling projection 38 moves on the arc $R_1$ and comes into coincidence with the point of intersection h. When the hand is released from the operating lever 12 and grips the steering wheel 1 which has rotated to the leap-up position and the steering wheel 1 is tilted in the direction of arrow B, namely, downwardly, against the force of the tension spring 25, the upper coupling hole 40 in the upper bracket means along the first arc $R_2$ centered at the center of rotation $O_3$ of the coupling member 21, and the center $O_4$ of the coupling hole 40 becomes coincident with the point of intersection h on the arc $R_1$ centered at the rod 26, and the rod 26 moves axially with the aid of the compression spring 30, so that the coupling protrusion 38 fits in the aforementioned coupling hole 40. Therefore, the upper and lower brackets 10, 11 are coupled together while being tilted by the tilt angle $\alpha$ and the steering wheel 1 assumes the position indicated by H in FIG. 1. When the operating lever 12 is likewise moved in the direction of arrow B, the coupling protrusion 38 fits in the lower coupling hole 41 to couple the upper and lower brackets 10, 11 together and the steering wheel 1 assumes the position indicated by L in FIG. 1. Even where the position of the steering wheel 1 is fixed at other than such neutral position, the steering wheel 1 leaps up to the leap-up position by the operating lever 12 being moved in the direction of arrow C, and the steering wheel 1 can be returned from the leap-up position to its original position H or L by moving only the steering wheel 1. This is because only one coupling hole is present on each of the first arc $R_2$ and the second arc $R_3$ centered at the coupling member 21 and coupling never takes place at other position by mistake.

Figure 6:
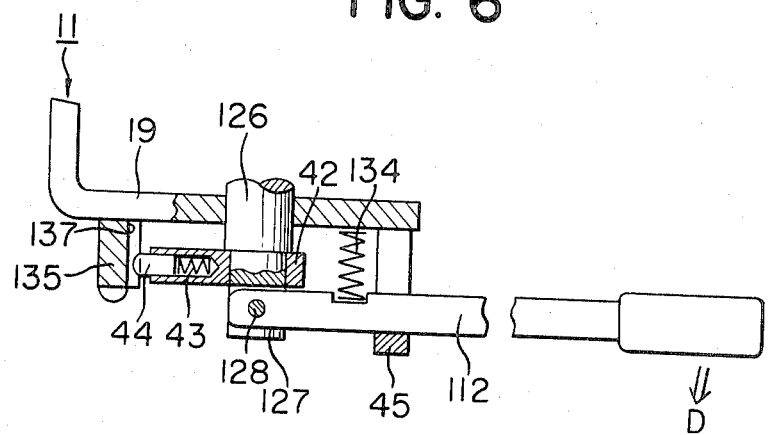
FIG. 6 is a cross-sectional view similar to FIG. 3 showing essential portions of another embodiment of the present invention.
Figure 7:
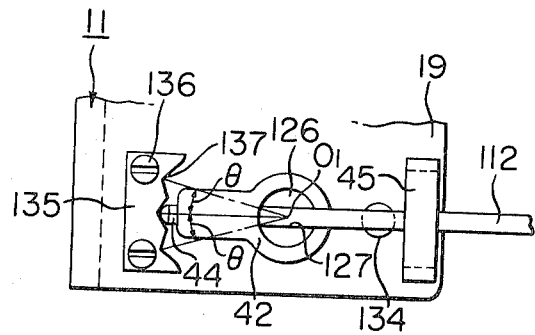
FIG. 7 is a side view of FIG. 6.

FIGS. 6 and 7 show another embodiment of the rod, operating lever and selecting device. As in the first embodiment, a rod 126 having a connecting arm fixed thereto and supported by the opposite side plates of the lower bracket for rotation and axial movement has a small-diametered portion provided at the end thereof jutting out of the left side plate 19, and a plate 42 is fixed to the small-diametered portion by means similar to the connecting arm 29. A split 127 is provided in the further fore end of the rod 126 and the fore end of an operating lever 112 fits in the split and is pivotally connected thereto by means of a pin 128. The plate 42 comprises a boss portion fitted over the rod 126, and an arm portion extending from the boss portion toward the fore end of the operating lever 112, the arm portion being provided with a hole in which are fitted a compression spring 43 and a slidable pin 44 which provides a selecting protrusion urged outwardly by the compression spring 43, and a block 135 of the selecting device is secured to the left side plate 19 by means of small screws 136 so as to oppose the slidable pin 44. Also, a gate-shaped lever fulcrum block 45 is secured to the left side plate 19 on the opposite side from the block 135 with respect to the rod 126 by arbitrary means such as welding or the like and supports the operating lever 112 from the outside thereof. Intermediate the rod 126 and the lever fulcrum block 45, a compression spring 134 has its opposite ends urged against the inner side surfaces of the left side plate 19 and the operating lever 112. In the inner side surface of the operating lever 112 a hole for containing one end of the compression spring 134 therein is provided and a guide pin (not shown) is studded to hold the compression spring 134, and the other end of the compression spring 134 is covered by a cup-shaped member, not shown.

Three recesses 137 are formed in that side surface of the block 135 of the selecting device which is adjacent to the rod 126, and when the steering wheel is in its neutral position, the slidable pin 44 is restrained in the central recess 137 as viewed in FIG. 7, and the upper and lower recesses 137 are provided at an arbitrarily selected angle $\theta$ with respect to the central recess 137 and at radial positions centered at the center of rotation $O_1$ of the rod 126. In the other respects, the construction of the present embodiment is similar to that of the first embodiment, and when the operating lever 112 is moved in the direction of arrow D, namely, leftwardly to the driver, the fore end of the operating lever 112 pivotally connected to the rod 126 is moved rightwardly with the lever fulcrum block 45 as the fulcrum to move the rod 126 axially rightwardly, so that the connecting protrusion 38 comes out of the coupling hole.

While the selecting device has been provided on the left side plate 19, it may also be provided on the right side plate 18 and the plate 42 having the slidable pin 44 may be fixed to the fore end of the rod 126 jutting out from the right side plate 18. That is, the operating lever 112 may be pivotally connected to one end of the rod 126 and the plate 42 may be fixed to the other end of the rod 126. Also, if a pin is provided on the left side plate 19 and the fore end of the operating lever 112 is pivotally connected thereto and the fore end of the rod 126 is positioned with a slight clearance with respect to the inner side surface of the operating lever 112 so that the rod can be axially moved by being pushed by the operating lever when the operating lever 112 is moved rightwardly and if the arm is fixed to the fore end of the rod 126 and a pin hole is provided at the fore end of the arm and a long pin studded in the operating lever 112 is fitted in the pin hole so as to transmit the rotation of the operating lever to the rod 126, then the angle of rotation of the rod will be greater than the angle of rotation of the operating lever. That is, when the operating lever is rotated by the arbitrarily selected angle $\theta$ of the selecting device, the rod will be rotated by an angle greater than $\theta$. By doing so, the intervals between the coupling holes formed in the side plate of the other bracket can be made greater and this will provide a solution to the problem in strength which would occur when the intervals between the coupling holes are small.

In the tilt type steering device of the present invention constructed as described above, the steering wheel can be moved to the leap-up position by moving the operating lever rightwardly or leftwardly and with the aid the spring attached to the upper and lower brackets and the favorite driving position of the steering wheel can be selected by moving the operating lever rightwardly or leftwardly and rotating the operating lever. The selected driving position does not change even if the steering wheel is repetitively reciprocated between the leap-up position and the driving position unless the operating lever is rotated, and it is not necessary to select the driving position each time the driver gets on the driver's seat. As previously described, to move the steering wheel from the driving position to the leap-up position, the knob of the operating lever has only to be pushed rightwardly or leftwardly, but to return the steering wheel from the leap-up position to the driving position, the steering wheel may be gripped and tilted and the operating lever need not be operated. Further, one reciprocation of the steering wheel only requires the operating lever to be once pushed rightwardly or leftwardly. Thus, the following effects are obtained.

(1) The ready-to-handle operation of either simply pushing the knob of the operating lever rightwardly or leftwardly or pushing the knob and rotating it up and down is only required.

(2) The steering wheel is tilted to the leap-up position by a simple operation of pushing the knob of the operating lever rightwardly or leftwardly to thereby permit the driver to readily get on and off the driver's seat.

(3) The driver's favorite driving position can be selected through a simple operation of pushing the operating lever rightwardly or leftwardly and rotating it up or down.

(4) Once the driving position is selected, the steering wheel may return from the leap-up position to the driving position also when the vehicle is driven next time.

(5) The operating lever need be operated only once during the time that the steering wheel is once reciprocated from the driving position to the leap-up position and from the leap-up position to the driving position and if the steering wheel is tilted downwards by gripping it in the hand, the steering wheel returns from the leap-up position to the driving position.

(6) The construction is simple and does not require any member which will require machining accuracy.

By the way, the lower bracket 11 may be made integral with the column bracket 8, and the rod 26 has been shown as being provided on the lower bracket 11, but this is because of the advantage that the positions of the coupling holes provided in the upper bracket 10 can be found out through a simple construction, and alternatively, the rod 26 may be supported by the upper bracket 10 and the coupling holes may be provided in the lower bracket 11.

I claim:

1. A tilt type steering device having an upper bracket fixed to the lower portion of an upper column rotatably supporting an upper shaft having a steering wheel mounted thereon; said upper bracket having downwardly extending side plates on the opposite sides thereof, a lower bracket fixed to the upper portion of a lower column fitted over a lower shaft connected to a steering gear and mounted on a vehicle body portion, said lower bracket having upwardly extending side plates on the opposite sides thereof, the side plates of one of said upper and lower brackets being overlapped with the side plates of the other bracket, an angle limiting means for coupling said upper and lower brackets and permitting said upper bracket to tilt with respect to said lower bracket between an upper-most position and a lower-most position on the center line of a joint connecting said upper and lower shafts together, a first biasing means for biasing said upper bracket toward the upper-most position, a rod member supported for rotation and axial movement by the side plates of one of said brackets, a connecting member fixed to said rod member and extending adjacent to one of the side plates of the other bracket, a second biasing means for biasing said connecting member axially of said rod member toward said one side plate, an operating member connected to said rod member so as to be capable of imparting to said rod member rotation and axial movement resisting the biasing force of said second biasing means, an engaging means provided on one of said rod member and said operating member, a selecting means provided on said one bracket, said selecting means being provided with a plurality of portions arranged at radial positions centered at the center of rotation of said rod member with predetermined selected angles therebetween, said portions restraining said engaging means, said connecting member having a coupling protrusion at the outer end thereof, the side plate of the other bracket which is adjacent to said connecting member being provided with a plurality of coupling holes capable of mating with said coupling protrusion of said connecting member, a first one of said coupling holes being adapted to mate with said coupling protrusion when said engaging means is restrained in one of said portions of said selecting means and the steering wheel is in its neutral position, the other coupling holes being provided at positions whereat they mate with said coupling protrusion when said engaging means is restrained in the other portion of said selecting means than the portion of said selecting means which has restrained said engaging means when the steering wheel is in its neutral position and when said upper bracket is tilted with respect to said lower bracket forming predetermined tilt angles relative to the position of said upper bracket which it takes when the steering wheel is in its neutral position.

2. A tilt type steering device according to claim 1, wherein the other coupling holes than said first coupling hole are provided about the point of intersection between a plurality of arcs passing through points of intersection between an arc centered at the center of rotation $O_1$ of said rod member and having as its radius the distance from the center of rotation $O_1$ to the center $O_2$ of said first coupling hole when the steering wheel is in its neutral position and a plurality of straight lines passing through the center of rotation $O_1$ of said rod member at an angle equal to the sum of more than one of said selected angles with respect to a straight line passing through said two centers $O_1$ to $O_2$, and centered at the center of tilting motion $O_3$ between said two brackets; and straight lines on said first coupling hole side passing through the center of tilting motion $O_3$ at angles equal to the tilt angles with respect to straight lines passing through the center of tilting motion $O_3$ and said point of intersections between said arc centered at the center of rotation $O_1$ and said straight lines passing through the center of rotation $O_1$.

* * * * *